(12) United States Patent
Dickow et al.

(10) Patent No.: US 9,998,547 B2
(45) Date of Patent: Jun. 12, 2018

(54) VEHICLE COMPUTING SYSTEMS AND METHODS FOR DELIVERY OF A MOBILE DEVICE LOCKOUT ICON

(71) Applicant: MYINE ELECTRONICS, INC., Ferndale, MI (US)

(72) Inventors: Justin Dickow, Royal Oak, MI (US); Michael Burke, Detroit, MI (US); Stefan Bankowski, Royal Oak, MI (US); Michael Wollman, Marina del Rey, CA (US)

(73) Assignee: Livio, Inc., Royal Oak, MI (US)

( * ) Notice: Subject to any disclaimer, the term of this patent is extended or adjusted under 35 U.S.C. 154(b) by 61 days.

(21) Appl. No.: 14/750,197

(22) Filed: Jun. 25, 2015

(65) Prior Publication Data

US 2016/0381209 A1    Dec. 29, 2016

(51) Int. Cl.
| | | |
|---|---|---|
| *H04M 3/00* | (2006.01) | |
| *H04L 29/08* | (2006.01) | |
| *H04M 1/725* | (2006.01) | |
| *H04W 4/04* | (2009.01) | |
| *H04M 1/60* | (2006.01) | |
| *H04M 1/67* | (2006.01) | |

(52) U.S. Cl.
CPC ...... *H04L 67/146* (2013.01); *H04M 1/72527* (2013.01); *H04W 4/046* (2013.01); *H04M 1/6083* (2013.01); *H04M 1/67* (2013.01); *H04M 1/72561* (2013.01)

(58) Field of Classification Search
CPC . H04M 1/72577; H04L 67/146; H04W 12/08; H04W 4/005; H04W 4/046; H04W 4/008
See application file for complete search history.

(56) References Cited

U.S. PATENT DOCUMENTS

| | | | |
|---|---|---|---|
| 2013/0138723 A1 | 5/2013 | Ku et al. | |
| 2014/0113593 A1* | 4/2014 | Zhou | H04L 63/20 455/411 |
| 2014/0188615 A1 | 7/2014 | Badenhop | |
| 2014/0280580 A1* | 9/2014 | Langlois | H04W 4/005 709/204 |
| 2014/0282245 A1 | 9/2014 | Scarborough | |
| 2014/0378063 A1* | 12/2014 | Nathwani | H04W 4/008 455/41.3 |
| 2015/0099495 A1* | 4/2015 | Crosbie | B60W 50/14 455/414.3 |
| 2015/0334219 A1* | 11/2015 | Soundararajan | H04M 1/67 455/414.1 |

(Continued)

*Primary Examiner* — Barry W Taylor
(74) *Attorney, Agent, or Firm* — Jennifer M. Stec; Brooks Kushman P.C.

(57) ABSTRACT

A vehicle computing system includes at least one processor configured to provide a lockout icon to a mobile device using a uniform resource identifier. The at least one processor is further configured to, in response to established communication with the mobile device having a user-interface display, retrieve the uniform resource identifier based on an application being executed at the mobile device. The at least one processor is further configured to transmit the uniform resource identifier to the mobile device to lockout the user-interface display with the lockout icon associated with the uniform resource identifier.

20 Claims, 5 Drawing Sheets

(56) References Cited

U.S. PATENT DOCUMENTS

| | | | | |
|---|---|---|---|---|
| 2015/0373479 A1* | 12/2015 | Xia | ............... | H04W 4/005 455/420 |
| 2016/0037307 A1* | 2/2016 | Roth | ............... | H04W 4/046 709/206 |
| 2016/0164881 A1* | 6/2016 | Bankowski | ............... | H04W 4/005 726/4 |

* cited by examiner

VEHICLE COMPUTING SYSTEMS AND METHODS FOR DELIVERY OF A MOBILE DEVICE LOCKOUT ICON

TECHNICAL FIELD

The present disclosure relates generally to icons, and more particularly to a vehicle computing system configured to provide a lockout icon to a mobile device.

BACKGROUND

Vehicle based computing systems are growing in popularity. Using various sources of vehicle information as well as driver inputs and connections to vehicle systems, the computing system may add a variety of functionality and novelty to the driving experience. Furthermore, systems may often communicate with remote devices either to gain information from those devices, or to use those devices to access an application. For example, the vehicle computing system may communicate with a mobile device, and use the mobile device's ability to execute an application at the mobile device to send and receive information from the application. With the integration of a variety of functionality being received from the mobile device, the driving experience may be improved by directing driver input to a vehicle user interface for the vehicle-based computing system instead of to the mobile device interface.

SUMMARY

In at least one embodiment, a vehicle computing system includes at least one processor configured to provide a lockout icon to a mobile device using a uniform resource identifier. The at least one processor is further configured to, in response to established communication with the mobile device having a user interface display, retrieve the uniform resource identifier based on an application being executed at the mobile device. The at least one processor is further configured to transmit the uniform resource identifier to the mobile device to lock out the user interface display with the lockout icon associated with the uniform resource identifier.

In at least one embodiment, a mobile device includes a display and a processor configured to communicate with a vehicle computing system. The processor is further configured to transmit a message to notify the vehicle computing system of an application in a foreground state. The processor is further configured to receive a uniform resource locator from the VCS. The processor is further configured to transmit the uniform resource locator to a server. The processor is further configured to output the lockout icon at the display based on a received lockout icon from the server associated with the uniform resource locator.

In at least one embodiment, a computer-program product embodied in a non-transitory computer readable medium that is programmed for a vehicle processor and comprising instructions for storing a uniform resource locator associated with an image. The computer-program product includes further instructions for establishing a communication connection with a mobile device. The computer-program product includes further instructions for transmitting the uniform resource locator based on an application being executed in a foreground state at the mobile device, wherein the uniform resource locator provides the image at a display of the mobile device for locking-out user interaction.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (FLASH, random access memory (RAM), read only memory (ROM), electrically programmable read only memory (EPROM), electrically erasable programmable read only memory (EEPROM), or other suitable variants thereof, for example) and software which co-act with one another to perform operation(s) disclosed herein. In addition, any one or more of the electric devices may be configured to execute a computer program that is embodied in a non-transitory computer readable medium that is programmed to perform any number of the functions as disclosed.

The disclosure relates to a locked screen icon that is displayed on a mobile device user interface when the mobile device is connected to a vehicle computing system. The vehicle computing system may store a uniform resource locater that is associated with a predefined icon stored at a remote server. The vehicle computing system may establish a communication link with the mobile device. The vehicle computing system may receive a notification from an application being executed at the mobile device. In response to the notification, the vehicle computing system may transmit the stored uniform resource locator to the mobile device so that a specific icon image may be displayed at the mobile device user interface as a locked screen for the mobile device. The purpose of the locked screen icon is to encourage a user to control the application being executed at the mobile device from a vehicle interface or head unit, rather than controlling the application directly from the mobile device.

The locked screen icon may be updated and stored at a remote server. The locked screen icon may be configured as a generic or branded icon for an application stored at the mobile device. The vehicle computing system may be configured by the vehicle manufacturer to update the icon through a server or vehicle computing system without requesting the application developer to update a logo image library in the application. For example, one or more vehicle manufacturers may implement the application executed at a mobile device while allowing the vehicle computing system to output the locked screen icon with the respective vehicle manufacture brand.

Figure 1:
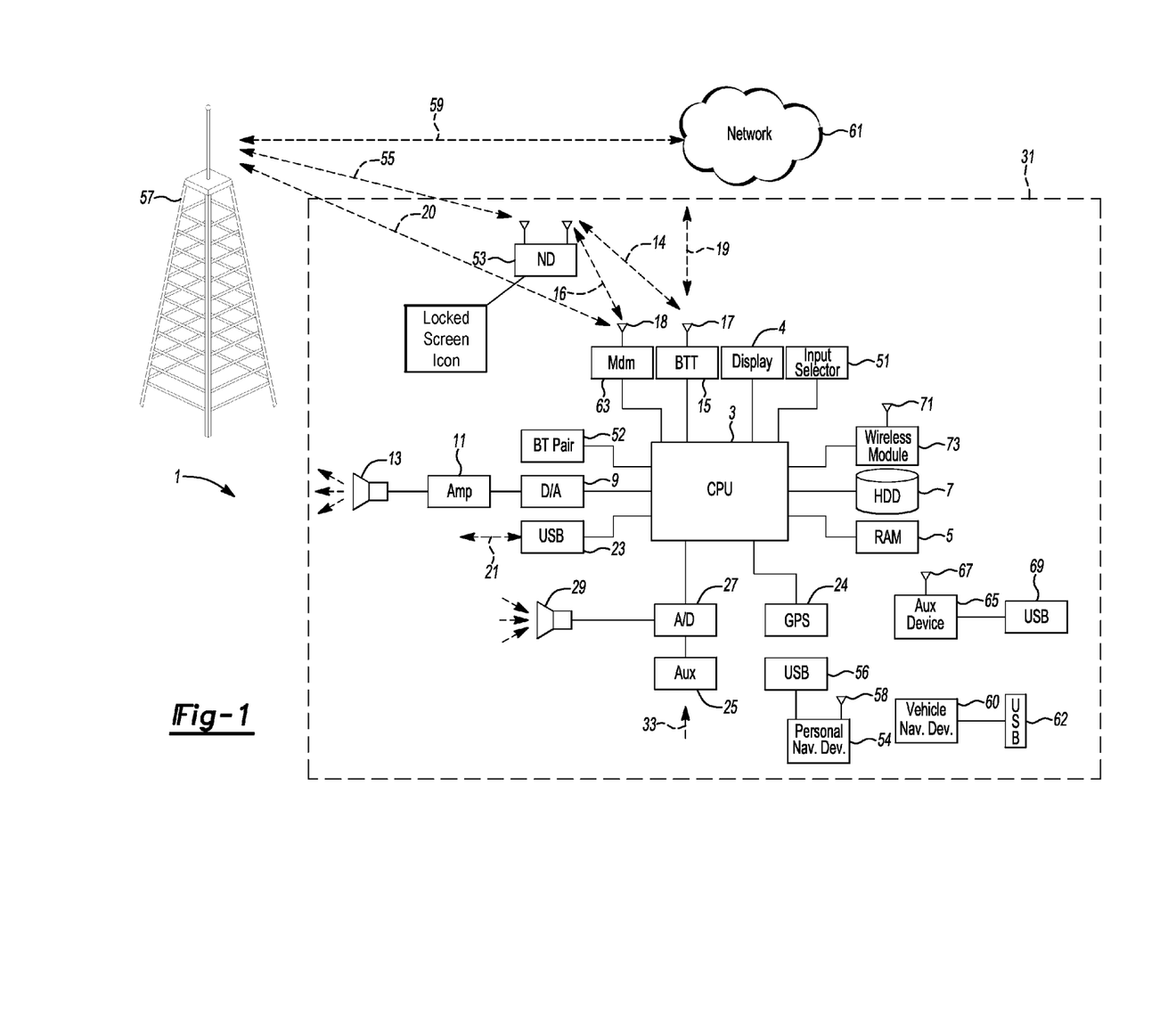
FIG. 1 is a representative block topology of a vehicle infotainment system implementing a user-interactive vehicle information display system according to an embodiment.

FIG. 1 illustrates an example block topology for a vehicle based computing system 1 (VCS) for a vehicle 31. An example of such a VCS 1 is the SYNC system manufactured by THE FORD MOTOR COMPANY. A vehicle enabled with a VCS 1 may contain a visual front end interface 4 located in the vehicle 31. The user may also be able to interact with the interface if it is provided, for example, with a touch sensitive screen. In another illustrative embodiment, the interaction occurs through button presses and/or spoken dialog with automatic speech recognition and speech synthesis.

In the illustrative embodiment 1 shown in FIG. 1, a processor 3 controls at least some portion of the operation of the vehicle-based computing system. Provided within the vehicle 31, the processor 3 allows onboard processing of commands and routines. Further, the processor 3 is connected to both non-persistent 5 and persistent storage 7. In this illustrative embodiment, the non-persistent storage 5 is random access memory (RAM) and the persistent storage 7 is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor 3 is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to choose between various inputs. Input to both the microphone and the auxiliary connector is converted from analog to digital by a converter 27 before being passed to the processor. Although not shown, numerous vehicle components and auxiliary components in communication with the VCS 1 may use a vehicle network (such as, but not limited to, a CAN bus) to pass data to and from the VCS (or components thereof).

For example, a near field communication (NFC) transceiver may be integrated with the VCS 1. The NFC transceiver may communicate with the processor 3. The NFC transceiver 75, such as a Texas Instrument™ TRF7970A, may be configured to communicate with one or more mobile devices. The NFC transceiver may include an RFID tag, a loop antenna, a flexible fabric packaging material and an EMI shielding material. The NFC transceiver may be used to communicate and authentic a mobile device. For example, the NFC transceiver may communicate with the mobile device configured with NFC and having an application embedded within the mobile device computing system.

Outputs to the system can include, but are not limited to, a visual display 4 and a speaker 13 or stereo system output. The speaker 13 is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21, respectively.

In one illustrative embodiment, the system 1 uses the BLUETOOTH transceiver 15 to communicate 17 with a user's mobile device 53 (cell phone, smart phone, tablet, PDA, or any other device having wireless remote network connectivity, for example). The mobile device (nomadic device, for example) can then be used to communicate 59 with a network 61 outside the vehicle 31 through, for example, communication 55 with a cellular tower 57. In some embodiments, tower 57 may be a WiFi access point. Communication between the mobile device 53 and the BLUETOOTH transceiver is generally represented by signal 14.

Pairing a mobile device 53 and the BLUETOOTH transceiver 15 can be instructed through a button 52 or similar input. Accordingly, the CPU 3 is instructed that the onboard BLUETOOTH transceiver will be paired with a BLUETOOTH transceiver in a mobile device 53.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor 3 is provided with an operating system including an application program interface (API) to communicate with modem application software. An example of such an API is the SmartDeviceLink project providing a software framework to integrate brought in applications onto the VCS. The modem application software may access an embedded module or firmware on the BLUETOOTH transceiver to complete wireless communication with a remote BLUETOOTH transceiver (such as that found in a mobile device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, mobile device 53 includes a modem for voice band or broadband data communication. In the data-over-voice embodiment, a technique known as frequency division multiplexing may be implemented when the owner of the mobile device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), and Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data plan allows for broad-band transmission and the system could use a much wider bandwidth (speeding up data transfer). In still another embodiment, mobile device 53 is replaced with a cellular communication device that is installed to vehicle 31. In yet another embodiment, the mobile device (the nomadic device illustrated as ND 53, for example) may be a wireless local area network (LAN) device capable of communication over, for example (and without limitation), an 802.11g network (i.e., WiFi) or a WiMax network.

In one embodiment, incoming data can be passed through the mobile device 53 via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having various processes executed by a vehicle computing system located in a vehicle, in certain embodiments, processes may be executed by a computing system in communication with a vehicle computing system. Such a system may include, but is not limited to, a wireless mobile device (mobile phone, for example) or a remote computing system (a server, for example) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process includes sending or receiving information with a paired wireless device, then it is likely that the wireless device is not performing the process, since the wireless device would not "send and receive" information with itself. One of ordinary skill in the art will understand when it is inappropriate to apply a particular VACS to a given solution. In all solutions, it is contemplated that at least the vehicle computing system (VCS) located within the vehicle itself is capable of performing the representative processes.

Figure 2:
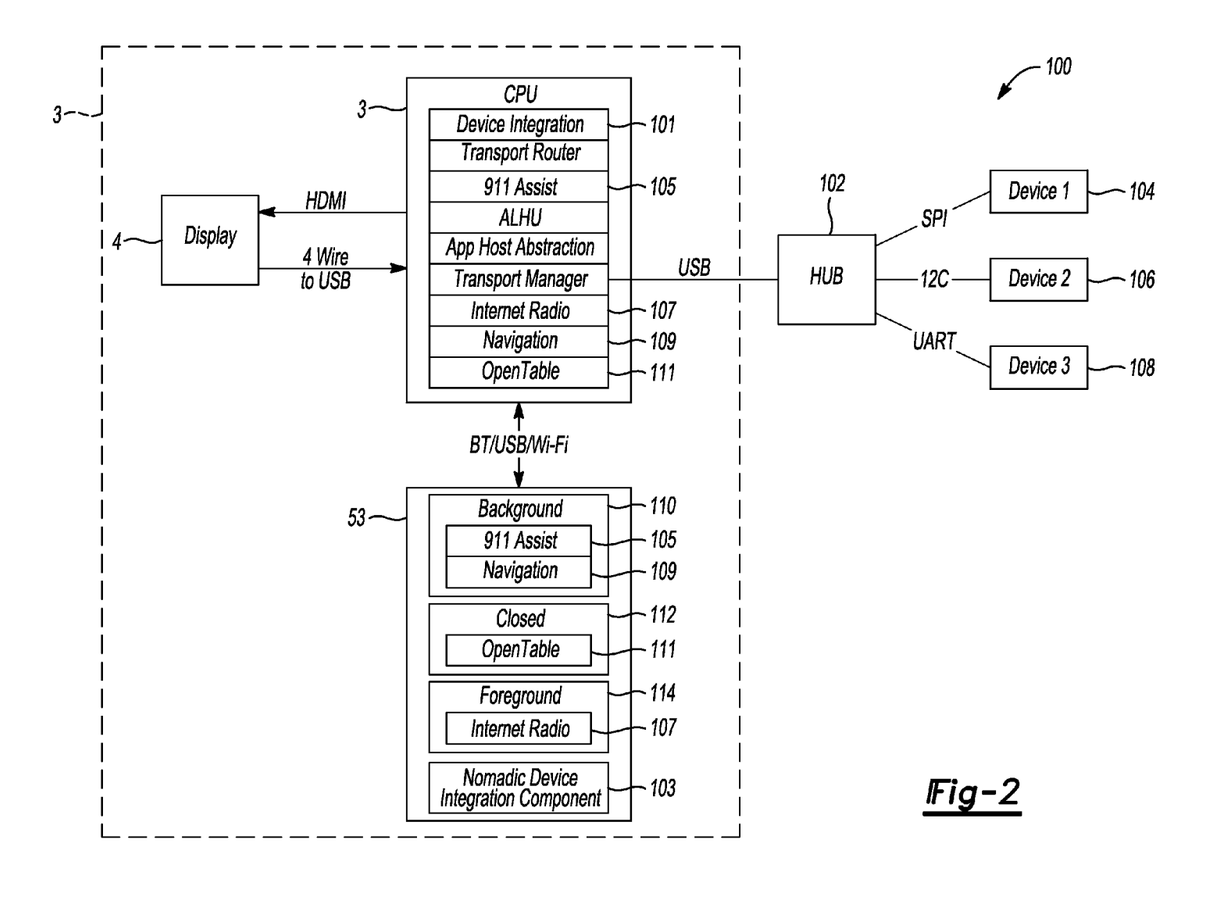
FIG. 2 is a representative block topology of a system for integrating one or more connected devices with the vehicle based computing system according to an embodiment.

FIG. 2 is a representative block topology of a system 100 for integrating one or more connected devices with the VCS 1. The CPU 3 may be in communication with one or more transceivers. The one or more transceivers are capable for wired and wireless communication for the integration of one or more devices. To facilitate the integration, the CPU 3 may include a device integration framework 101 configured to provide various services to the connected devices. These services may include transport routing of messages between the connected devices and the CPU 3, global notification services to allow connected devices to provide alerts to the user, application launch and management facilities to allow for unified access to applications executed by the CPU 3 and those executed by the connected devices, provide a user interface lockout icon to prevent a user from interacting with the mobile device, and point of interest location and management services for various possible vehicle destinations. For example, the CPU 3 may output one or more applications at the display 4 that are executed at the connected mobile device 53.

In another example, the CPU 3 may transmit an icon lockout screen request to the mobile device 53. The icon lockout screen request may include a uniform resource locator so that the mobile device 53 may retrieve a specific icon associated with the CPU 3. In response to the icon lockout screen request, the mobile device 53 may communicate with a remote server to receive the icon stored at the uniform resource locator. The mobile device 53 may lock out a user interface screen while displaying the icon. The displayed icon lockout user interface screen may prevent a user from interacting with a mobile device user interface while the mobile device 53 is communicating with the VCS 1.

As mentioned above, the CPU 3 of the VCS 1 may be configured to interface with one or more mobile devices 53 of various types. The mobile device 53 may further include a device integration client component 103 to allow the mobile device 53 to take advantage of the services provided by the device integration framework 101. The integration client component 103 may include an application program interface to enable the interaction between the mobile device 53 and the VCS 1. The mobile device 53 may execute one or more applications including, but not limited to, 911 Assist™ 105, internet radio 107, navigation 109, OpenTable™ 111, etc. The one or more applications may be in a background state 110, a closed state 112 or a foreground state 114 at the mobile device 53. The CPU 3 may output the one or more applications at the display 4. For example, in response to an established communication with the mobile device 53, the CPU 3 may indicate whether the one or more applications are in the foreground state, background state or closed state. In one example, the VCS may display the one or more applications in a foreground state, background state, or closed state based on the color, brightness and/or shading of an icon representing the application(s).

In one example, the VCS 1 may receive a message that an application has entered a foreground state at the mobile device 53. The VCS 1 may transmit the uniform resource locater to the mobile device based on the application entering the foreground state. The mobile device 53 may retrieve an icon display based on the uniform resource locator via an internet connection. The mobile device 53 may lock out the mobile device user interface by outputting the icon retrieved at the uniform resource locator.

The mobile device 53 may transmit application notifications to the CPU 3 so that the VCS 1 may track which application is in the foreground state. For example, the VCS 1 may receive a message that the internet radio application 107 is running in the foreground state 114. The VCS 1 may output an icon at the in-vehicle display 4 for the internet radio application 107 indicating that it is in the foreground state 114. The VCS 1 may be configured to transmit an updated uniform resource locator for an icon based on a new application being executed in the foreground state.

In one example, the VCS 1 may receive an application launch request for 911 Assist™ 105. The VCS 1 may receive a manually input 911 Assist™ application 105 launch request via the display 4 and/or an automatically input request based on a received emergency notification via an advanced crash safety module (ACSM). In response to the 911 Assist™ 105 in the background state 110 at the mobile device 53, the CPU 3 may transmit a launch request for the 911 Assist™ application 105. For example, the launch request may include a unique application identifier for the 911 Assist™ application 105. In response to receiving the launch message for the 911 Assist™ application 105 at the mobile device 53, the mobile device may disable the lockout at the mobile device user interface so that a user and/or emergency personnel may access the mobile device 53.

The one or more transceivers may include a multiport connector hub 102. The multiport connector hub 102 may be used to interface between the CPU 3 and additional types of connected devices other than the mobile device 53. The multiport connector hub 102 may communicate with the CPU 3 over various buses and protocols, such as via USB, and may further communicate with the connected devices using various other connection buses and protocols, such as Serial Peripheral Interface Bus (SPI), Inter-integrated circuit (I2C), and/or Universal Asynchronous Receiver/Transmitter (UART). The multiport connector hub 102 may further perform communication protocol translation and interworking services between the protocols used by the connected devices and the protocol used between the multiport connector hub 102 and the CPU 3. The connected devices may include, as some non-limiting examples, a radar detector 104, a global position receiver device 106, and a storage device 108. The CPU 3 may receive a message from the connected devices indicating applications running in the foreground state. The CPU 3 may transmit a request to lock out user input functions at the connected device. For example, in response to a connected device not having a user interface display, the connected device may lock out functionality of one or more hard input buttons based on the icon lockout screen request received from the VCS 1. In another example, the connected device may lock out a connected device user interface screen based on the icon lockout screen request.

Figure 3:
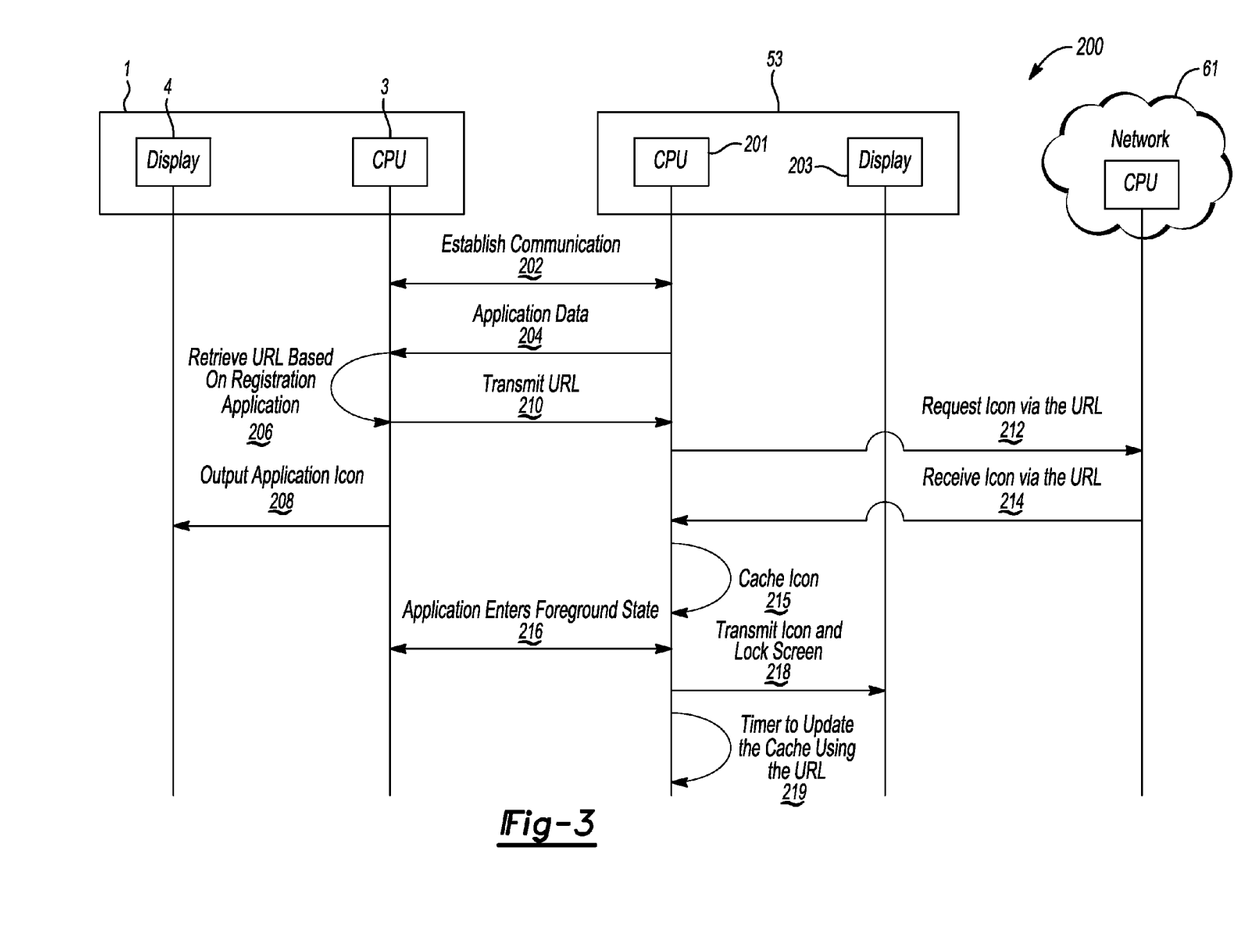
FIG. 3 is a block diagram illustrating the vehicle based computing system in communication with a connected device according to an embodiment.

FIG. 3 is a block diagram illustrating the VCS 1 in communication with a connected device 53 according to an embodiment. The VCS 1 may include one or more processors (CPU 3, for example), a wireless transceiver, and an in-vehicle display 4. The mobile device 53 may include one or more processors (CPU 201, for example), a wireless transceiver, and a mobile device user interface display 203. The remote server 61 may include one or more processors, a database, and/or a communication link within an antenna 19 to communicate data with the mobile device 53.

The VCS 1 may establish communication with the mobile device 53 via a handshake process 202. The handshake process 202 may include a series of communications back and forth between the VCS 1 and mobile device 53 for system access authentication. If the handshake is complete, the VCS 1 may receive data from an application executed at the mobile device 53. For example, the handshake process may include the exchange of information to detect whether or not the mobile device 53 has been paired with the VCS 1. In another example, the VCS 1 may be executing an application associated with the mobile device 53. The application may have a key configured to verify that the VCS 1 is authorized to communicate with the mobile device 53.

The VCS 1 may communicate application data 204 with the mobile device 53. For example, the application data from the mobile device 53 may include messages received from one or more applications registered to communicate with the VCS 1. In response to the application data, the VCS 1 may retrieve a uniform resource locator (also known as a uniform resource identifier, URL, etc., for example) 206 based on a registered application. The VCS 1 may transmit the uniform resource locator (URL) 210 to the mobile device 53. The VCS 1 may output an application icon at the in-vehicle display 208 based on the application data.

The mobile device 53 may search for an internet connection based on the received URL. The mobile device 53 may transmit a request for an icon via the URL 212 at the remote server 61 based on the internet connection. The mobile device 53 may receive the icon stored at the URL 214 from the remote server 61. The mobile device 53 may cache the icon 215 in memory electrically connected to the CPU 201. The mobile device 53 may transmit a lockout request while displaying the icon at the user interface display 216. In one example, the mobile device 53 may output a generic icon at the user interface display 216 if there is no internet connection with the remote server 61.

In another example, the mobile device 53 may receive a request to launch an application from a background state to the foreground state. The mobile device 53 may transmit a message notifying the VCS 1 that the application is in the foreground state 216. In response to the application in the foreground state at the mobile device 53, the VCS 1 may output the related icon 208 at the in-vehicle display 4. The VCS 1 may transmit a message (transmit an updated URL, for example) to the mobile device 53 based on the latest application entering the foreground state. The mobile device may retrieve a new icon based on the latest application to enter the foreground state. In one example, the mobile device may receive an updated URL based on the latest application being launched in the foreground state. The mobile device may retrieve the updated icon via the updated URL at the remote server 61. The mobile device may transmit the updated icon and lockout screen 218 to the mobile device user interface display 203.

The mobile device may be configured to have a predefined timer associated with the cached icon. For example, in response to an amount of time exceeding the predefined timer, the mobile device may transmit a request to update the cached icon using the URL 219. The mobile device 53 may output the icon based on the update to the cached icon.

Figure 4:
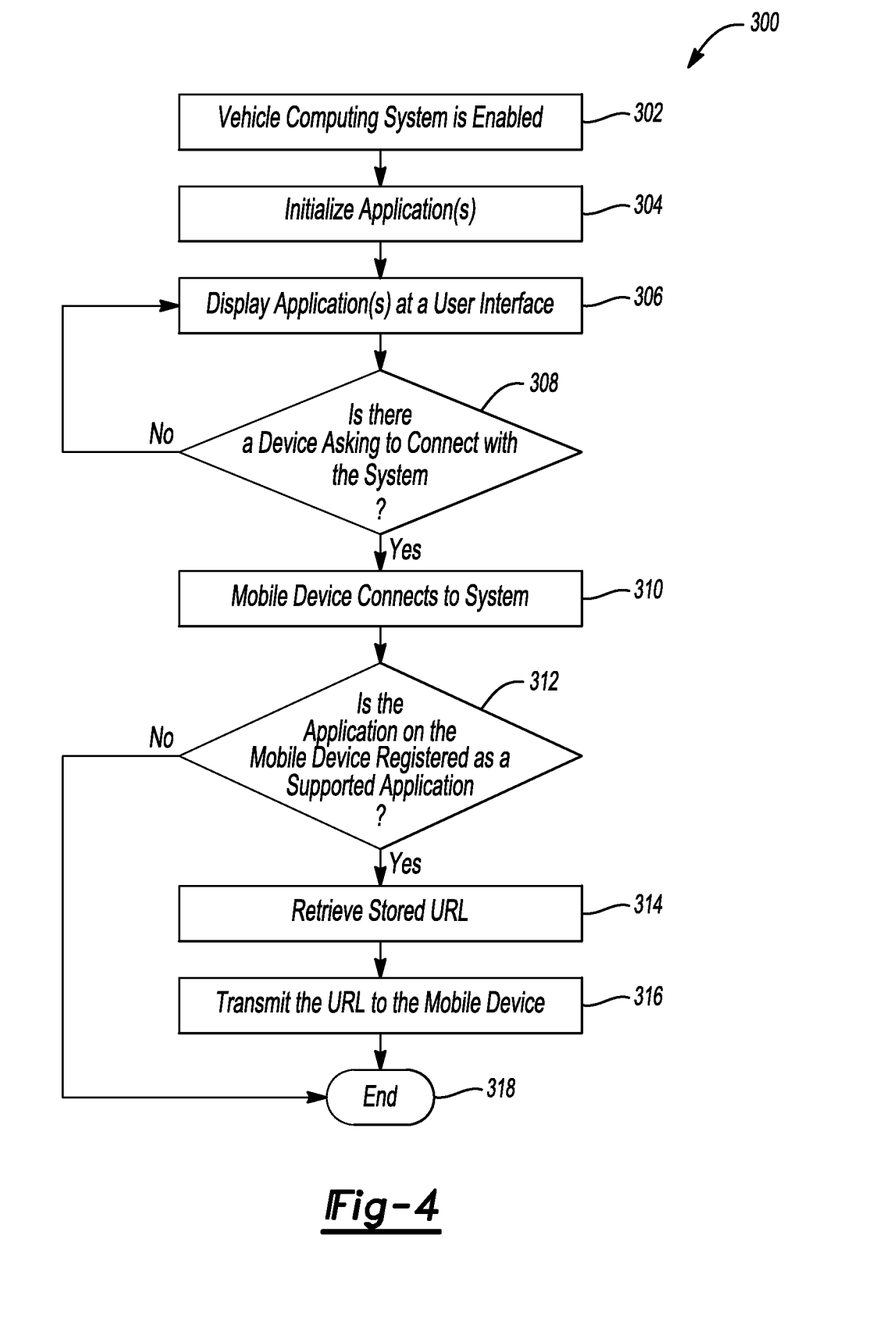
FIG. 4 is a flow chart illustrative of the vehicle based computing system providing a lockout image to the connected device using a uniform resource locator according to an embodiment.

FIG. 4 is a flow chart illustrative of the vehicle based computing system providing a lockout image to the connected device using a uniform resource locator according to an embodiment. The method 300 may be implemented using software code contained within the VCS 1. In other embodiments, the method 300 may be implemented in other vehicle controllers, distributed among multiple vehicle controllers, or executed at a remote controller in communication with the VCS 1.

Referring again to FIG. 4, the vehicle and its components illustrated in FIG. 1, FIG. 2, and FIG. 3 are referenced throughout the discussion of the method 300 to facilitate understanding of various aspects of the present disclosure. The method 300 of providing a lockout icon to a mobile device 53 may be implemented through a computer algorithm, machine executable code, or software instructions programmed into a suitable programmable logic device(s) of the vehicle, such as the vehicle control module, the device control module, another controller in communication with the vehicle computing system, or a combination thereof. Although the various operations shown in the flowchart diagram 300 appear to occur in a chronological sequence, at least some of the operations may occur in a different order, and some operations may be performed concurrently or not at all.

In operation 302, the VCS 1 may be initialized and enabled based on a key-on position of an ignition system. The VCS 1 may initialize the one or more applications for execution in operation 304. In response to the initialization of the VCS 1, the system may display the one or more applications at a user interface in operation 306.

In operation 308, the VCS 1 may enable a wireless communication transceiver to search for a mobile device 53 requesting to connect with the system. If the VCS 1 detects no mobile device 53 requesting to connect, the system may continue to output a wireless communication message via the transceiver.

If the mobile device 53 is detected, the VCS 1 may attempt to connect using a wireless communication link via the transceiver in operation 310. The communication link may include wireless communication technology (Bluetooth, Bluetooth low energy, WiFi, etc., for example). In response to the communication link with the mobile device 53, the VCS 1 may receive data from one or more application executed at the mobile device 53.

In operation 312, the VCS 1 may determine if the application executed at the mobile device 53 is registered as a supported application. For example, the VCS 1 may compare an application identifier to a database of approved applications to determine if the application being executed at the mobile device 53 is registered to communicate with the system. In response to a registered application, the VCS 1 may retrieve a stored URL in operation 314. The VCS 1 may transmit the URL to the mobile device 53 in operation 316. In response to the transmission of the URL, the VCS 1 may end the method 300 of the VCS 1 providing the lockout icon (image displayed at the mobile device user interface, for example) to the mobile device 53 in operation 318.

Figure 5:
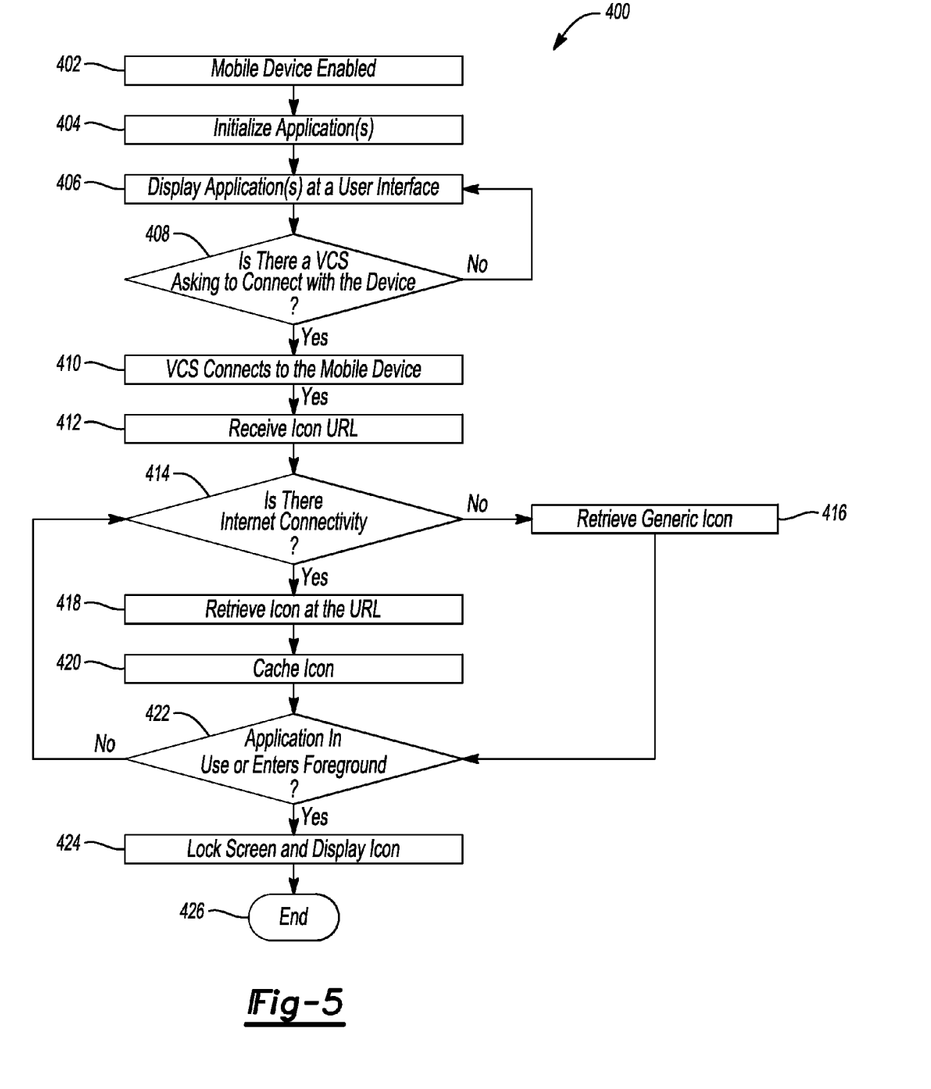
FIG. 5 is a flow chart illustrative of the mobile device outputting a lockout icon based on a connection with the vehicle based computing system according to an embodiment.

FIG. 5 is a flow chart illustrative of the mobile device 53 outputting a lockout icon based on a connection with the VCS 1 according to an embodiment. The method 400 may be implemented using software code contained within the mobile device 53. In other embodiments, the method 400 may be implemented in other processors in communication with the mobile device 53, distributed among multiple processors including the VCS 1, or a combination thereof.

In operation 402, the mobile device 53 may be initialized and enabled based on a power-on request. The mobile device 53 may initialize one or more applications for execution based on the power-on request in operation 404. In response to the initialization of the mobile device 53, the device may output one or more applications at a user interface in operation 406.

In operation 408, the mobile device 53 may enable a wireless communication transceiver to search for the VCS 1 requesting to connect with the device. If the mobile device 53 detects no VCS 1 requesting to connect, the device may continue to output a wireless communication message via the transceiver.

If the VCS 1 is detected, the mobile device 53 may attempt to connect using a wireless communication link via the transceiver in operation 410. In response to the communication link, the mobile device 53 may receive the icon lockout screen request in operation 412. The icon lockout screen request may include the icon URL.

In operation 414, the mobile device 53 may search for an internet connectivity communication link. If there is no internet communication link, the mobile device 53 may retrieve a generic icon for output as the lockout screen display for the mobile device user interface in operation 416. In response to an established internet communication link, the mobile device 53 may retrieve the icon via the URL at the remote server in operation 418. The mobile device may cache the icon received from the remote server in operation 420.

In operation 422, the mobile device 53 may determine if the application is in use, therefore being executed in the foreground state. In response to the application in the foreground state, the mobile device 53 may lockout the mobile device user interface and output the retrieved icon via the URL or the generic icon in operation 424. In response to the output of the icon lockout screen at the mobile device user interface display, the mobile device 53 may end the method 400 in operation 426.

The embodiments disclosed above enable application developers to create a mobile application that may be used on multiple vehicle telematics systems. The disclosure presents embodiments of a vehicle telematics system that transmits an icon via the URL associated with the system to the mobile device when communicating with the mobile application. The icon provides a brand presence to a customer associated with the vehicle and infotainment system at the mobile device.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle computing system comprising:
   at least one processor configured to, in response to establishing communication with a mobile device having a user interface display, retrieve a uniform resource identifier corresponding to an application being executed in a foreground state at the mobile device; and transmit the uniform resource identifier to the mobile device to lock out the user interface display with a lockout icon retrieved from the uniform resource identifier.

2. The vehicle computing system of claim 1, wherein the processor is further configured to receive a notification requesting the uniform resource identifier from the mobile device responsive to the application entering the foreground state.

3. The vehicle computing system of claim 1, wherein the processor is further configured to communicate with an in-vehicle display and output a vehicle icon associated with the application executed at the mobile device at the in-vehicle display.

4. The vehicle computing system of claim 1, wherein the mobile device is configured to, in response to establishing communication with a remote server, transmit the uniform resource identifier to the remote server and receive the lockout icon associated with the uniform resource identifier from the remote server.

5. The vehicle computing system of claim 4, wherein the lockout of the user interface display at the mobile device prevents a user from interacting with one or more functions at the user interface display.

6. The vehicle computing system of claim 4, wherein the remote server is configured to store the lockout icon associated with the uniform resource identifier.

7. A mobile device comprising:
   a display; and
   a processor configured to,
      in response to an establishing communication with a vehicle computing system (VCS), transmit a message to notify the VCS of an application in a foreground state;
      receive a uniform resource locator (URL) from the VCS, the URL corresponding to the application in the foreground state;
      transmit the URL to a server; and
      in response to a received lockout icon from the server associated with the URL, output the lockout icon at the display.

8. The mobile device of claim 7, wherein the processor is further configured to, in response to the output of the lockout icon, lock out at least one of the display and an input button to prevent a user from interacting with the display and the input button.

9. The mobile device of claim 7, wherein the processor is further configured to, detect an internet connection to communicate with the server, and if no internet connection is detected, output a generic lockout icon at the display.

10. The mobile device of claim 7, wherein the processor is further configured to cache the lockout icon in memory electrically connected to the processor, and to update the lockout icon in the memory based on a predefined timer.

11. The mobile device of claim 7, wherein the server is configured to store the lockout icon associated with the URL.

12. The mobile device of claim 7, wherein the processor is further configured to, in response to a disconnection request received from the VCS, remove the lockout icon from the display to allow user interaction with the display.

13. A computer-program product embodied in a non-transitory computer readable medium for a vehicle processor comprising instructions for:
   storing a plurality of uniform resource locators (URLs), each corresponding to an icon of a different application; and
   in response to an establishing connection with a mobile device, transmitting the URL corresponding to the one of the applications being executed in a foreground state at the mobile device to cause the mobile device to retrieve the icon to display on a lockout screen.

14. The computer-program product of claim 13, the non-transitory computer readable medium further comprising instructions for receiving a foreground state notification from the application requesting the URL.

15. The computer-program product of claim 13, the non-transitory computer readable medium further comprising instructions for communicating with an in-vehicle display and outputting a vehicle icon associated with the application executed at the mobile device to the in-vehicle display.

16. The computer-program product of claim 13, wherein the mobile device is configured to, in response to establishing communication with a remote server, transmit the uniform resource locator to the remote server and receive the image associated with the URL from the remote server.

17. The computer-program product of claim 16, wherein the icon received from the remote server is cached in memory at the mobile device.

18. The computer-program product of claim 17, wherein the cached image is updated by a request via the URL to the remote server based on a predefined timer.

19. The computer-program product of claim 16, wherein the remote server is configured to store the icon associated with the URL.

20. The computer-program product of claim 13, wherein the locking-out of the display at the mobile device prevents a user from interacting with one or more functions at the display.

* * * * *